United States Patent
Gupta (10) Patent No.: US 10,713,861 B2
(45) Date of Patent: Jul. 14, 2020

(54) VEHICLE TRACKER FOR MONITORING OPERATION OF A VEHICLE AND METHOD THEREOF

(71) Applicant: Mahesh Gupta, New Delhi (IN)

(72) Inventor: Mahesh Gupta, New Delhi (IN)

( * ) Notice: Subject to any disclaimer, the term of this patent is extended or adjusted under 35 U.S.C. 154(b) by 28 days.

(21) Appl. No.: 16/078,180

(22) PCT Filed: Oct. 31, 2017

(86) PCT No.: PCT/IN2017/050505
§ 371 (c)(1),
(2) Date: Aug. 21, 2018

(87) PCT Pub. No.: WO2018/104956
PCT Pub. Date: Jun. 14, 2018

(65) Prior Publication Data
US 2019/0057558 A1    Feb. 21, 2019

(30) Foreign Application Priority Data

Dec. 6, 2016    (IN) .............................. 201611041718

(51) Int. Cl.
*B60W 50/04*    (2006.01)
*G07C 5/00*    (2006.01)
(Continued)

(52) U.S. Cl.
CPC ............... *G07C 5/008* (2013.01); *B60Q 9/00* (2013.01); *B60R 16/033* (2013.01); *B60W 40/08* (2013.01);
(Continued)

(58) Field of Classification Search
CPC ..... B60W 50/04; B60W 50/045; B40W 10/30
See application file for complete search history.

(56) References Cited

U.S. PATENT DOCUMENTS 7,103,460 B1    9/2006 Breed
10,430,883 B1 *  10/2019 Bischoff ................ G06Q 20/10
(Continued)

FOREIGN PATENT DOCUMENTS

DE           60036650 T2     7/2008

OTHER PUBLICATIONS

Dec. 8, 2017 International Search Report issued in International Patent Application No. PCT/IN2017/050505.
(Continued)

*Primary Examiner* — Charlie Y Peng
(74) *Attorney, Agent, or Firm* — Oliff PLC (57) ABSTRACT

A vehicle tracker (102) and a method for monitoring vehicle's activity are described. The vehicle tracker (102) has a connection port (216) which provides plug and play functionality. The vehicle tracker (102) further has a plurality of sensors (504) for sensing various parameters associated with the vehicle. The sensing results in generation of current parameter values (518) which are processed in relative to plurality of parameter threshold values (520). The parameter threshold values (520) define minimum and maximum range of the parameters. Based on the processing, the vehicle tracker (102) determines anomalies in the operation of the vehicle. Once the anomaly is detected, the vehicle tracker (102) generates an alert and sends it to the concerned person or user.

20 Claims, 4 Drawing Sheets

(51) Int. Cl.
*G08G 1/01* (2006.01)
*B60W 40/08* (2012.01)
*B60R 16/033* (2006.01)
*B60Q 9/00* (2006.01)
*G07C 5/08* (2006.01)
*G08G 1/017* (2006.01)
*B60W 50/14* (2020.01)
*B60W 40/09* (2012.01)
*G08G 1/00* (2006.01)

(52) U.S. Cl.
CPC ............ *B60W 40/09* (2013.01); *B60W 50/04* (2013.01); *B60W 50/14* (2013.01); *G07C 5/0825* (2013.01); *G08G 1/017* (2013.01); *G08G 1/0112* (2013.01); *G08G 1/0129* (2013.01); *G08G 1/0141* (2013.01); *G08G 1/20* (2013.01); *B60W 2040/089* (2013.01); *B60W 2552/00* (2020.02); *B60W 2552/35* (2020.02); *B60W 2554/00* (2020.02); *B60W 2900/00* (2013.01)

(56) References Cited

U.S. PATENT DOCUMENTS

| | | |
|---|---|---|
| 2002/0019703 A1 | 2/2002 | Levine |
| 2005/0024195 A1* | 2/2005 | Bai ........................ G01H 1/003 |
| | | 340/457 |
| 2014/0306817 A1 | 10/2014 | Ricci |
| 2015/0019266 A1 | 1/2015 | Stempora |
| 2015/0112504 A1 | 4/2015 | Binion et al. |
| 2016/0147222 A1* | 5/2016 | Haberl .................. B60W 50/14 |
| | | 701/2 |
| 2016/0379423 A1* | 12/2016 | Nagata ................ B60R 16/0234 |
| | | 701/31.5 |
| 2017/0330044 A1* | 11/2017 | Telpaz ............... B60H 1/00742 |
| 2018/0266834 A1* | 9/2018 | Cronin .................. B60R 16/037 |
| 2018/0273018 A1* | 9/2018 | Follen ...................... B60L 7/10 |
| 2019/0308633 A1* | 10/2019 | Hori ...................... B60W 10/30 |

OTHER PUBLICATIONS

Dec. 8, 2017 Written Opinion of the International Searching Authority issued in International Patent Application No. PCT/IN2017/050505.

Mar. 21, 2018 Office Action issued in Indian Patent Application No. 201611041718.

Jul. 17, 2018 Notice of Hearing in India Patent Application No. 201611041718.

Dec. 27, 2018 Order issued in India Patent Application No. 201611041718.

Jun. 25, 2019 International Preliminary Report on Patentability issued in International Application No. PCT/IN2017/050505.

* cited by examiner

VEHICLE TRACKER FOR MONITORING OPERATION OF A VEHICLE AND METHOD THEREOF

TECHNICAL FIELD

The present subject matter is related, in general, to a vehicle monitoring device for monitoring & tracking operation of a vehicle.

BACKGROUND

Vehicles are generally equipped with on-board diagnostics (OBD) devices that can provide information relating to the vehicle's fuel economy, emissions, mileage, speed, and other useful data via an on-board diagnostics (OBD) port. However, the OBD devices are fixed or permanently attached with the vehicle and are non-portable. Moreover, installation of such OBD devices is generally complex and often requires assistance from a skilled professional or technician.

Further, the OBD devices are manufactured with pre-defined functionalities. Accordingly, the OBD devices known in art are not customizable by an end user. Further, the OBD devices or any other equipment connected to the OBD devices known in the art are powered from a common battery positioned on the vehicle. If the vehicle is not used for a long duration, the OBD devices can unnecessarily drain the vehicle's battery. Also OBD devices do not have Camera and Audio sensors and hence cannot record video/audio. Present disclosure is directed to address one or more problems as discussed above or other related problems.

SUMMARY

Disclosed herein is vehicle tracker for monitoring vehicle's operation. The vehicle tracker comprises a connection port configured to selectively connect the vehicle tracker with a power socket as provided on the vehicle. The connection port is configured to receive power from the power socket of vehicle. The vehicle tracker further comprises a rechargeable battery to power the vehicle tracker when power is unavailable from the power source of the vehicle. The rechargeable battery is configured to be charged using the power from the power source. Further, the vehicle tracker has a plurality of sensors, interfaced with a processor of the vehicle tracker, for sensing a plurality of parameters associated with the vehicle. The sensing results in generation of a plurality of real-time parameter values of the plurality of parameters. The vehicle tracker further comprises a processing module to process the plurality of current parameter values relative to a plurality of parameter threshold values stored in a parameter database. Further, the vehicle tracker comprises an anomaly determining module to determine one or more anomalies based on the processing. The one or more anomalies indicate state of the vehicle's operation or driver behavior.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods of the present subject matter are now described, by way of example only, and regarding the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the spirit and the scope of the disclosure.

The present disclosure relates to a method and a vehicle tracker for monitoring driver behavior and tracking vehicle. According to embodiments of present disclosure, the vehicle tracker has a connection port which facilitates the user to easily attach and detach the vehicle tracker from the vehicle. The vehicle tracker also has a rechargeable battery which supplies power to the vehicle tracker when an external power source is not available.

The vehicle tracker further comprises various sensors for sensing vehicle's parameters. The detected vehicle's parameters are analyzed to determine any anomaly in the vehicle. According to the embodiments, the anomaly may be associated with mishandling of the vehicle or with driving behavior of the driver of the vehicle. Based on the anomaly determined, the vehicle tracker also notifies the concerned user or authorities by transmitting alerts to their respective devices. Here alerts may refer to mobile notification and/or snapshots of vehicles and/or audio alert and/or video message.

In the following detailed description of the embodiments of the disclosure, reference is made to the accompanying drawings that form a part hereof, and which are shown by way of illustrating specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
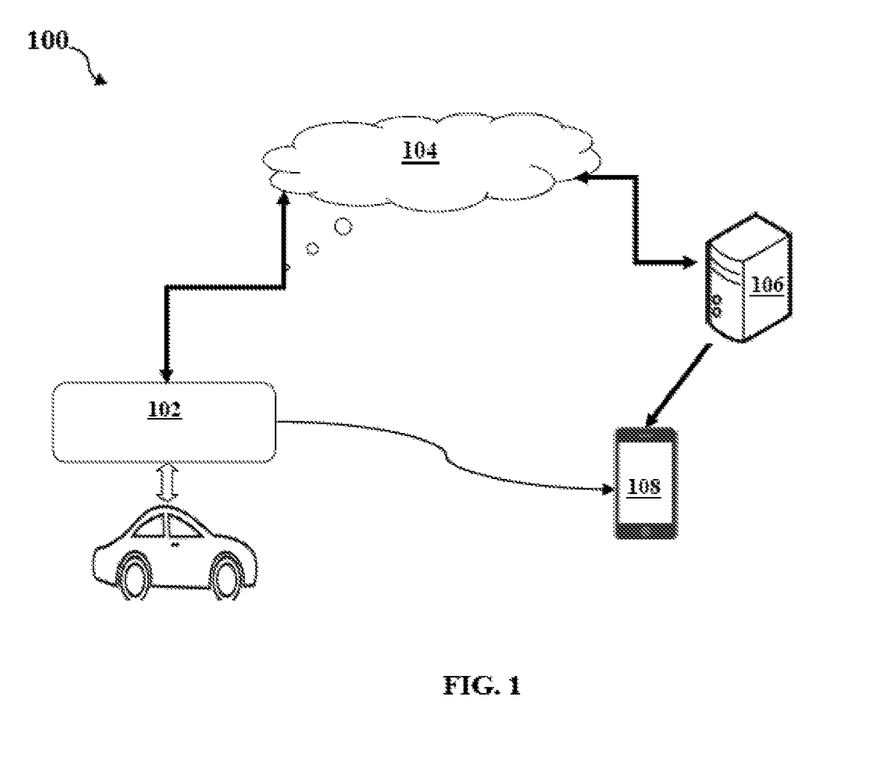
FIG. 1 schematically illustrates an exemplary environment for monitoring operation of a vehicle in accordance with an embodiment of the present disclosure.

Referring to FIG. 1, an environment 100 for monitoring vehicle's operation, in accordance with an embodiment of the present disclosure, includes a vehicle tracker 102, a communication network 104, a monitoring server 106, and a user device 108. It may be understood to a person skilled in art that there may be n number of user devices 108 connected with the vehicle tracker 102 or with the monitoring server 106 or both. The user device 108 may include smart-phones, laptops, desktop computers or any other computing devices. Further, the monitoring server 106 may be a central server connected with the vehicle tracker 102 and the user device 108. Further, the communication network 104 may be a wireless network, a wired network or a combination thereof.

The vehicle tracker 102 may be attached with the vehicle for monitoring driver behavior, tracking vehicle movement & operations. The vehicle tracker 102 may have various sensors for sensing different parameters of the vehicle. The sensing results in generation of parameter values which is further analyzed in relation to predefined parameter values. Based on the analysis, the vehicle tracker 102 determines various anomalies in the vehicle movement and operation or in driving behavior which is explained in detail in subsequent paragraphs of the specification.

According to an embodiment of present disclosure, the information regarding the detected anomalies are sent to the monitoring server 106 via the communication network 104. The monitoring server 106 may maintain a central repository of the anomalies detected by the vehicle tracker 102 and further transmit it to various user devices 108. The user may be the owner of the vehicle or any other person or entity employed for monitoring the operation of the vehicle. According to an embodiment of the present disclosure, the vehicle tracker 102 may directly send the detected anomalies to the user devices 108 via a wireless means.

According to an embodiment of present disclosure, vehicle tracker 102 may be accessed through mobile/web interface or web application by using the user device 108. The web application or the web interface associated with the vehicle tracker 102 may be installed on the user device 108 to remotely access the vehicle tracker 102. The user may be required to create a user account for using the web application/web interface by providing user credentials. Further, the user can use mobile/web interface to share the vehicle tracking details/operational parameters/video with other users. The sharing can either be in 'view only' mode in which other user will be able to only view tracker data, or in 'read/write' mode in which other user can also edit parameters. Further, the user can also share the view with other users based on credential for specific/all parameters.

Figure 2:
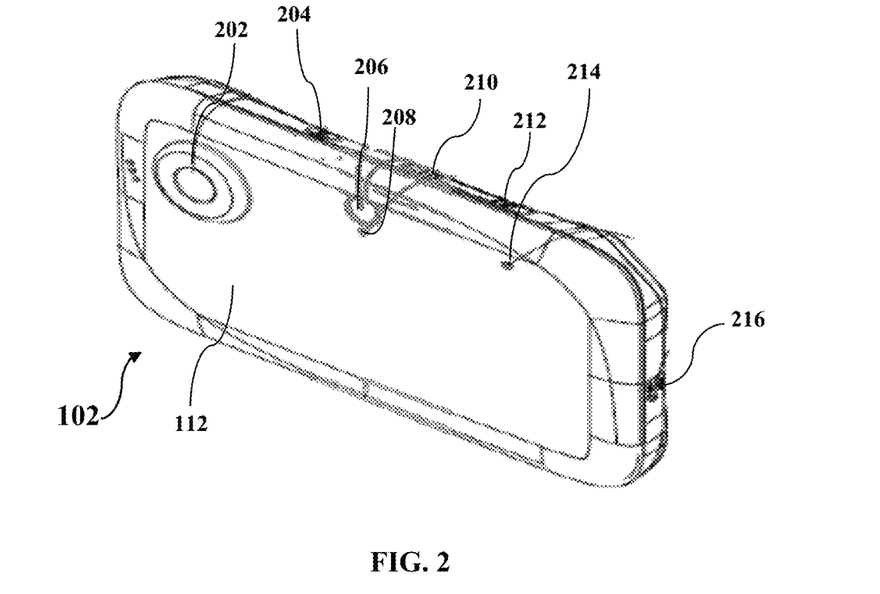
FIG. 2 illustrates a perspective front view of a vehicle tracker in accordance with an embodiment of the present disclosure.
Figure 3:
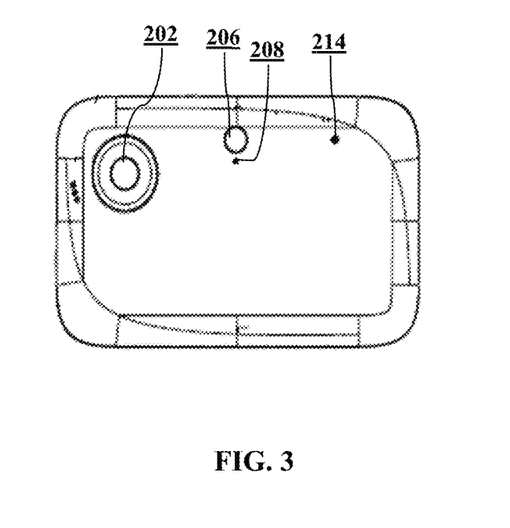
FIG. 3 illustrates a front view of the vehicle tracker as illustrated in FIG. 2.
Figure 4:
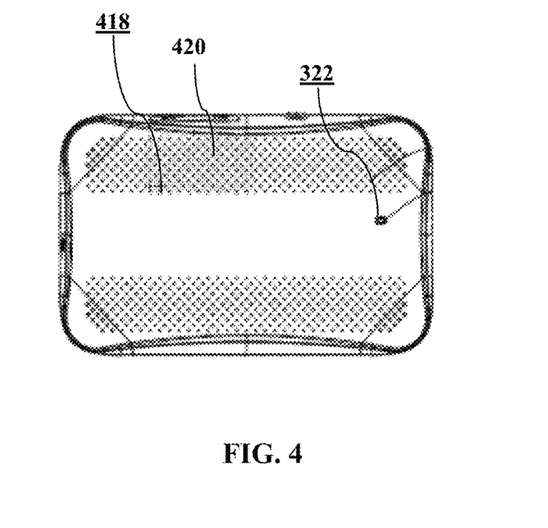
FIG. 4 illustrates a back view of the vehicle tracker as illustrated in FIG. 2.

FIGS. 2-4 illustrate a perspective view, front view, and back view of the vehicle tracker respectively in accordance with an embodiment of the present disclosure.

In FIGS. 2-4, different components of the vehicle tracker 102 are shown. As shown, the vehicle tracker has a housing 112 and a plurality of sensors placed in the housing 112. For example, the housing 112 of the vehicle tracker 102 houses an infrared camera or image sensor 202 on front side for capturing images inside the vehicle's cabin. The vehicle tracker 102 further has a power button 204 on a side edge of the housing 112 for turning the vehicle tracker 102 in ON or OFF state. Further, the vehicle tracker 102 has an ambient light sensor 206 on the front side of the housing for sensing external light falling on the vehicle tracker 102 to sense presence of amount/intensity of light inside the vehicle's cabin.

The vehicle tracker 102 further has a sound sensor 208 incorporated in the housing at its front side, for example a microphone for capturing audio inside the vehicle's cabin. Further, the vehicle tracker 102 has a slot 210 on one side edge for holding 2G/3G/4G SIM cards. The vehicle tracker 102 further has another slot 212 supported by the housing on the side edge for holding an external memory card. The vehicle tracker 102 further has a LED indicator 214 supported on the front side of the housing and a connection port or USB connection port 216. The connection port 216 enables the user to conveniently attach/detach the vehicle tracker 102 to a power socket. According to an embodiment, the power socket is a 12V socket of the vehicle. It may be understood that the power socket provides for connection of the vehicle tracker to a power source present on the vehicle. Most of the vehicles include a power socket for powering various ancillary devices a user may use.

Further, FIG. 4 indicates back view of the vehicle tracker 102. In FIG. 4, the reference numeral 418 indicates temperature sensor that is supported on a back side of the housing and reference numeral 420 indicates vents which are provided on the back side of the housing. The vents 420 are used for cooling the vehicle tracker 102. Further, the vehicle tracker 102 also has a front camera 322 provided on the back side of the housing as shown in FIG. 4 for capturing images outside the vehicle which are further analyzed for determining traffic patterns. The vehicle tracker may be mounted inside a vehicle cabin near the front windshield of the vehicle such that the front camera 322 faces the windshield to capture images outside the cabin of the view as visible from the front windshield and the image sensor 202 faces towards the remaining cabin to capture image of occupants/objects inside the cabin.

Figure 5:
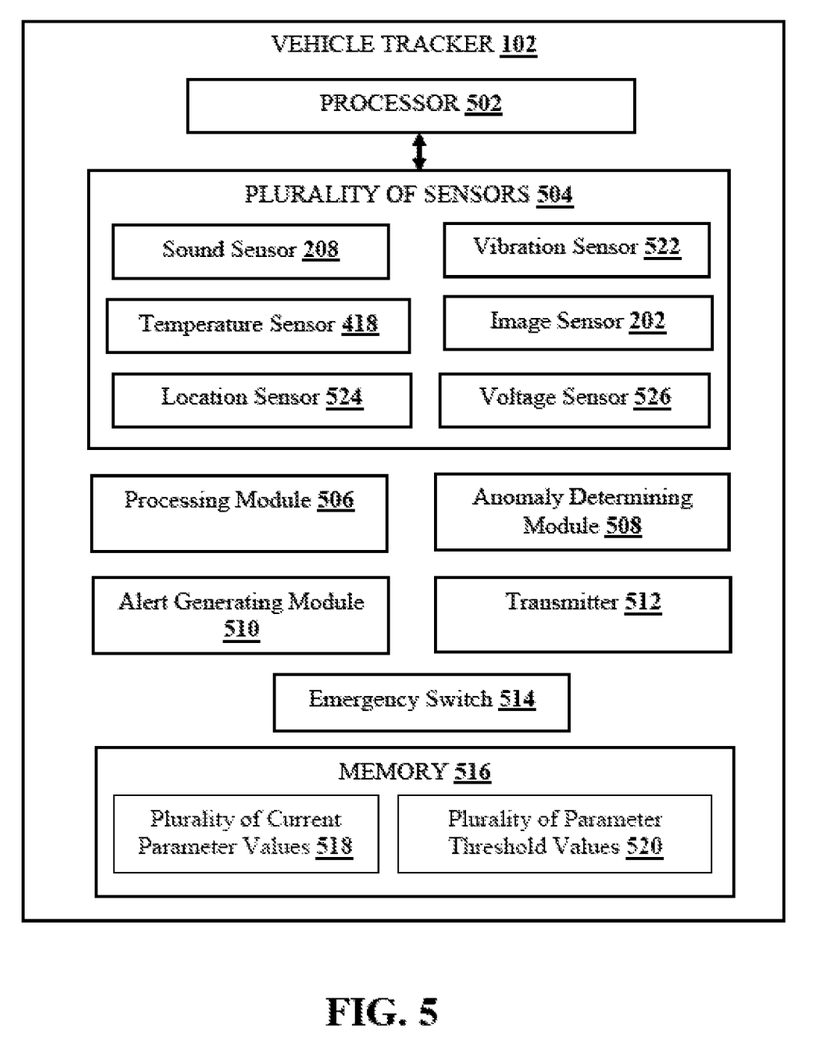
FIG. 5 illustrates a schematic block diagram illustrating a vehicle tracker in accordance with an embodiment of the present disclosure.

FIG. 5 illustrates a block diagram illustrating the vehicle tracker for monitoring vehicle operation in accordance with an embodiment of the present disclosure. As discussed earlier, the connection port 216 provides flexibility to the vehicle tracker 102 to connect with the power source of the vehicle. When the vehicle tracker 102 is not in use, the user may detach the vehicle tracker 102 from the power source of the vehicle. Thus, due to this portable nature, the vehicle tracker 102 may be used with different vehicles as per the user's choice. The vehicle tracker 102 also has a rechargeable battery for facilitating self-powering to the vehicle tracker 102 when power is unavailable from the power source on the vehicle. The vehicle tracker 102 is provided to monitor the activities on the vehicle. The activities may relate to driving behavior of the driver, handling of the vehicle by the driver, or any other activities/operations associated with the vehicle.

In first step, a plurality of sensors 504, interfaced with a processor 502 of the vehicle tracker 102, sense a plurality of parameters associated with the vehicle. According to embodiments of present disclosure, the plurality of parameters may include, but not limited to, sound, speed, temperature, vibration, cabin's image, location, and engine status of the vehicle. For sensing the aforesaid parameters, the plurality of sensors 504 may be used by the vehicle tracker 102. The plurality of sensors 504 may include sound sensor 208, a vibration sensor 522, a temperature sensor 418, an image sensor 202, a location sensor 524 and a voltage sensor 526. The sensing of these parameters may be triggered once the driver starts a journey or even when the vehicle is in an idle position. Further, the sensing results in generation of plurality of current parameter values 518 corresponding to the plurality of parameters.

Once the parameters are sensed, the next task is performed by the processing module 506 of the vehicle tracker 102 to process the plurality of current parameter values 518 in relation to a plurality of parameter threshold values 520 which may be stored in parameter database of the vehicle tracker 102. According to embodiments of present disclosure, the plurality of parameter threshold values 520 include predefined values of the parameters which indicate normal operation of the vehicle. If the current parameter values deviate from the predefined values or crosses the defined parameter thresholds, then an abnormal operation of the vehicle is indicated.

For determining such abnormality, an anomaly determining module 508 of the vehicle tracker 102 determines one or more anomalies based on the processing performed by the processing module 506. In other words, the one or more anomalies may indicate mishandling of the vehicle by the driver. For example, the engine of the vehicle may be in an idle state for a predefined time threshold. For determining such idle state of the engine, at first, the anomaly determining module 508 checks whether the engine of the vehicle is running by analyzing the output (i.e., vibration of the vehicle) received from the vibration sensor. Once it is confirmed that vehicle is vibrating, in next step, the anomaly determining module 508 checks whether the speed of the vehicle is zero by using output of the location sensor (GPS sensor). By analyzing and comparing both the outputs i.e., continuous vibrations at zero speed, the anomaly determining module 508 determines that the engine is running idle.

Similarly, the anomaly determining module 508 may detect the anomaly if the temperature of vehicle's cabin crosses a predefined temperature threshold. For example, if the current the temperature of vehicle's cabin is determined as 40 degrees Celsius and the predefined temperature threshold is in range of 17-27 degrees Celsius. Then, the anomaly determining module 508 determines this as an anomaly for alerting the concerned person. On the other hand, if the temperature of vehicle's cabin goes below the minimum limit i.e., 17 degrees Celsius, then the anomaly determining module 508 again determines this as an anomaly for alerting the concerned person.

Similarly, the anomaly determining module 508 may use the output of the vibration sensor 522 to check jerks/shock on the vehicle. If the vibration of the vehicle crosses a predefined vibration threshold or a vibration pattern, the anomaly determining module 508 determines that the driving style of the driver is rough or rash which may cause harm to him/her or to the vehicle.

Similarly, the anomaly determining module 508 may use sound data sensed by the sound sensor 208 to determine the anomaly. For example, if the sound level inside the vehicle's cabin crosses a predefined sound threshold, then the anomaly determining module 508 determines this as an anomaly for alerting the concerned person. In another embodiment, the sound sensor 208 may use speech recognition technology (inbuilt with the vehicle tracker 102) to identify certain words which are spoken in the emergency situation, for example the word 'Help'. If the anomaly determining module 508 identifies that there are sudden changes in vehicle driving pattern (speed/turn/jerk/break/cabin images) or with the emergency spoken words, it may trigger emergency alert/notification to the user or to emergency contacts.

Further, the anomaly determining module 508 may also detect tampering of the vehicle's component or tampering with components of the vehicle tracker 102. For example, if the driver tries to misuse heating, ventilation and air conditioning (HVAC) system of the vehicle, the anomaly determining module 508 detects such misuse. For determining such misuse, at first, the anomaly determining module 508 senses the temperature inside the vehicle's cabin by using the temperature sensor 418. Once the temperature is sensed, in second step, the anomaly determining module 508 determines real time position of the vehicle using the location sensor 524. Then in the third step, the anomaly determining module 508 receives the outside temperature of the vehicle from a third-party weather information provider using location received from the location sensor. However, according to an embodiment, the vehicle tracker may use an external temperature sensor for sensing the outside temperature of the vehicle. Now, once the vehicle's cabin temperature and the outside temperature is determined, the anomaly determining module 508 may check whether the vehicle's engine is running idle using the vibration sensor 522 and finally compares the difference between the vehicle's cabin temperature and the outside temperature. Based on the comparison, if a temperature difference is determined when the vehicle's engine is running for a long duration while the vehicle is stationary, then it is determined that the driver is misusing the HVAC system.

Further, tampering with the one or more components of the vehicle tracker 102 is also tracked by the anomaly determining module 508. For example, the anomaly determining module 508 may use a voltage sensor 526 to check whether any external power source is connected to the vehicle tracker 102. This is used to detect whether the driver has removed the power connection of the vehicle tracker 102 in order to drain the inbuilt rechargeable battery of the vehicle tracker 102. The anomaly determining module 508 detects the power source disconnection by checking whether the power source is connected using the voltage sensor 526. Then, the anomaly determining module 508 checks whether the vehicle engine is switched ON using the vibration sensor 522. Typically, the vehicle's 12V charger socket supplies the power when ignition is turned ON. Hence, if it is determined that the ignition is ON and there is no power in the vehicle tracker 102, the anomaly determining module 508 determines that the driver has disconnected the power source and accordingly generates an alert for the concerned person. In another embodiment, if the rechargeable battery level falls below a certain threshold, for example 15% or 20%, then an alert is generated and sent to the user device 108. Yet in another embodiment, if the rechargeable battery is about to be exhausted and the vehicle tracker 102 has to shut down, then an alert is generated and sent to the user device 108. Further, when the vehicle tracker 102 reboots after a shutdown due to battery exhaustion, an alert is generated and sent to the user device 108.

In another example, if the flash memory card or the memory 516, on which a video is recorded and other data is stored, is removed or inserted from/into the vehicle tracker 102, the anomaly determining module 508 determines this as an anomaly for alerting the concerned person or the user. Yet in another example, if the SIM card, which is used for internet connectivity, is removed or inserted from/into the vehicle tracker 102, the anomaly determining module 508 determines this as an anomaly for alerting the concerned person or the user.

According to embodiments, an alert generating module 510 of the vehicle tracker 102 generates one or more alerts corresponding to the anomalies detected (as discussed above). The one or more alerts generated may be in a form of a text message, an image, a video or a combination thereof. The alert generated is further transmitted by a transmitter 512 of the vehicle tracker 102 to the user device 108 associated with the user.

According to another embodiment of present disclosure, the vehicle tracker 102 may enable the user to set certain conditions for generating the alert. For example, the user may define a maximum speed limit for the vehicle using the web/mobile interface displayed on the user device 108. If the vehicle tracker 102 senses a speed higher than the defined speed limit, then the alert generating module 510 generates an alert and sends it to the user device 108.

In another example, the user may define a geo-fenced area for the vehicle by defining a radius against a fixed geo-coordinate using the web/mobile interface. If the location sensor 524 of the vehicle tracker 102 senses a geo-coordinate outside the defined radius, then the alert generating module 510 generates an alert and sends it to the user device 108.

Yet in another example, the user may define a maximum trip duration limit for the vehicle using the web/mobile interface. If the vehicle tracker 102 calculates a trip duration higher than the defined limit, then the alert generating module 510 generates an alert and sends it to the user device 108.

According to embodiments of present disclosure, a mounting kit may be provided which facilitates mounting of the vehicle tracker 102 on a windscreen, dashboard or any other suitable location on the vehicle. Further, vehicle tracker 102 may use the location sensor 524 for determining speed of the vehicle by calculating the distance travelled between source and target location and dividing it by time taken by the vehicle while travelling between the source and the target location.

According to embodiments of present disclosure, the image sensor 202 may start taking snapshots as soon as the vehicle's ignition is switched ON/predefined event like movement/temperature rise/jerk/etc. happens and keeps recording till the ignition is not switched OFF/after certain delay. Similarly, audio sensor may start recording vehicle audio as soon as the vehicle's ignition is switched ON, or at predefined event like movement, temperature rise, jerk, etc. happens and keeps recording till the ignition is not switched OFF after certain delay. These snapshots along with vehicle cabin audio are captured continuously from the device and stored temporarily in device memory before uploading to the server 106. The snapshots may be taken after predetermined time intervals, happening of certain events (change in temperature/jerk/speed changes etc). When the user wants to view these images, then the server 106 may stitch the snapshots together to form a time lapsed video for ease of viewing. This ensures that lower amount of data, for example 70% to 75%, is transferred to the monitoring server 106 or to the user device 108 which leads to effective usage of the bandwidth of the network and also lowering mobile data transfer charges paid by the user. Further, in case the vehicle tracker 102 is lost or stolen, the time lapsed video is available on the monitoring server 106 for remote surveillance.

Further, the user may request for the snapshot or the video, through the web interface or web application, even if the vehicle tracker 102 is out of power or out of network area. In such case, the request is queued at the monitoring server 106 and whenever the vehicle tracker 102 comes back online or in the network range, the requested snapshot or the video is sent to the user device 108.

Further, the user may also playback the recorded video in an interactive manner through the web interface so that alerts generated during the duration of video recording are interactively overlaid on the video.

According to an embodiment of the present disclosure, vehicle tracker 102 may use the image sensor 202 (with/without night vision capability) for viewing live video and/or audio from inside the vehicle's cabin. User can use the mobile/web interface and request live feed from inside vehicle.

Further, the user may also manage multiple vehicle trackers 102 by using a single user account through the web interface. The data generated by the multiple vehicle trackers 102 may be viewed on a single screen via the web interface. The user may also share the data generated by the vehicle trackers with other users such as friends, relatives with view-only rights by using the web interface. According to embodiments, the data generated by different vehicle trackers 102 may be stored on the monitoring server 106. Further, the monitoring server 106 may share such data with devices associated with third party such as taxi operators, government authorities and the like which can use or relay the data for their own needs. Further, the sharing of vehicle's data may facilitate intelligent mass transportation and secure fleet management.

According to another embodiment of present disclosure, the vehicle tracker 102 may incorporate masking technology while delivering the real-time/recorded video to the user device 108. The masking technology may be used to mask the video at least partially. For example, the video recorded from the front camera 322 and the image sensor 202 is saved in the memory 516 of the vehicle tracker 102 or on the monitoring server 106 without face masking. However, while delivering the video to user device 108, the face may be masked for privacy reason. However, in-case of specific requirement, the video with face may be provided to law enforcement or other agencies.

According to further embodiments of present disclosure, the vehicle tracker 102 may comprise an emergency switch 514 (for example a SOS button) which when long pressed by a person generates an alert and sends a notification to the user device 108 or any other agency like police, hospital, friends, and family, etc.

According to further embodiments of present disclosure, the user may configure the setting of the vehicle tracker 102 such that it cannot be switched OFF once it is activated. The vehicle tracker 102 may be configured to switch OFF only if the power source of the vehicle is disconnected and the rechargeable battery is exhausted. This option is provided to the user to prevent the driver of the vehicle from switching the vehicle tracker 102 OFF.

According to further embodiments of present disclosure, the vehicle tracker 102 uses the front camera 322 to record or capture traffic movement or/and traffic data along with location. Further, the traffic data is relayed to the monitoring server 106 for deriving traffic and vehicle driving patterns. The front camera 322 also captures path data related to bumps, road condition, street signs, potholes and the like and send it to the monitoring server 106. Further vibration sensor captures road condition while vehicle is in motion with the help of vehicle vibration data. According to embodiments, the path data may be analyzed by the monitoring server 106 or by the processing module 506 for providing real-time assistance information to other vehicles passing through same path. According to another embodiment, All the data related to roads, traffic, street signage etc., can be used by other vehicles, devices, corporations for autonomous vehicles, road condition monitoring/street signage etc. According to embodiments, the traffic data may be used by other devices/equipment for designing autonomous vehicles and by other authorities for determining road conditions.

In another embodiment, vehicle tracker 102 can be used to track the location, movements of various components inside vehicle cabin. This is achieved by first taking snapshot of various components by camera or image sensor 202 and later comparing it with previous snapshot at regular interval. Further, this information can be used to determine and tampering of components inside vehicle.

Figure 6:
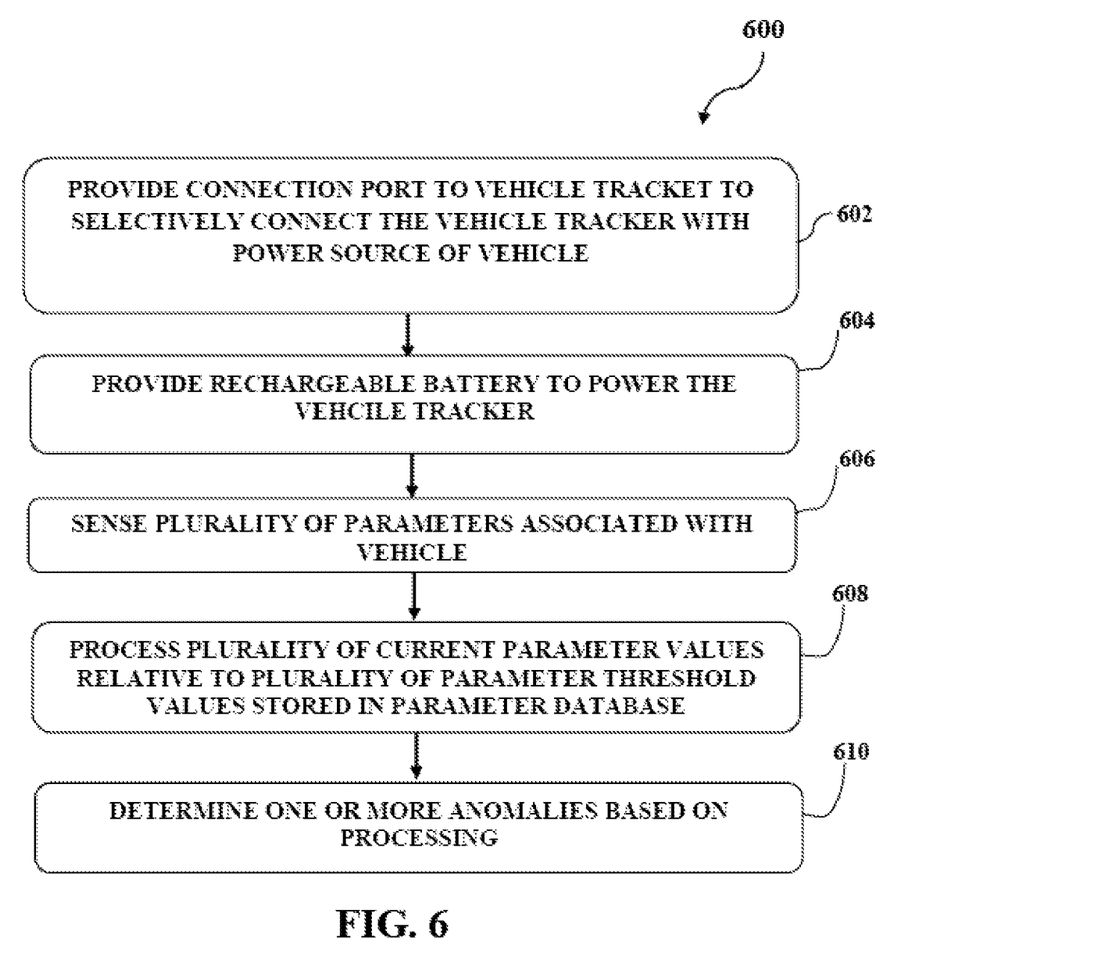
FIG. 6 illustrates a method of monitoring operation of a vehicle in accordance with the present disclosure.

FIG. 6 shows a flowchart illustrating a method for monitoring vehicle's operation in accordance with an embodiment of the present disclosure. As illustrated in FIG. 6, the method 600 includes one or more blocks illustrating a method of monitoring operation of the vehicle using vehicle tracker 102. The method 600 may be described in the general context of computer executable instructions. Generally, computer executable instructions can include routines, programs, objects, components, data structures, procedures, modules, and functions, which perform specific functions or implement specific abstract data types.

The order in which the method 600 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 602, the method 600 includes providing a connection port 216 to the vehicle tracker 102 to selectively connect the vehicle tracker 102 with a power source on the vehicle. The connection port 216 is configured to receive power from the power source.

At block 604, the method 600 includes providing a rechargeable battery to the vehicle tracker 102 to power the vehicle tracker 102 when power is unavailable from the power source of the vehicle. The rechargeable battery is configured to be charged using power from the power source At block 606, the method 600 includes sensing, by a plurality of sensors 504 interfaced with a processor 502 of the vehicle tracker 102, a plurality of parameters associated with the vehicle. The sensing results in generation of a plurality of current parameter values 518 of the plurality of parameters. According to embodiments, the plurality of parameters includes at least one of sound, speed, temperature, vibration, cabin's image, location, and engine status of the vehicle. According to embodiments, the plurality of sensors 504 include at least one of a sound sensor 208, a vibration sensor 522, a temperature sensor 418, an image sensor 202, a location sensor 524, and a voltage sensor 526.

At block 608, the method 600 includes processing, by a processing module 506, the plurality of current parameter values 518 relative to a plurality of parameter threshold values 520 stored in a parameter database.

At block 610, the method 600 includes determining, by an anomaly determining module 508, one or more anomalies based on the processing. The one or more anomalies indicate state of the vehicle's operation.

The present disclosure provides a plug and play and a rechargeable vehicle tracker for monitoring vehicle's operation. The vehicle tracker 102 as disclosed herein provides a cost-effective and reliable communications link to track vehicle location, monitor driver behavior, minimize vehicle resource waste, monitor multiple data related to sound, location, temperature, audio/video inside vehicle and collect road and driving related data. Further, the present disclosure provides a method for extending the functionality of the vehicle tracker by allowing additional sensors to be incorporated with the vehicle tracker. The vehicle tracker 102 as disclosed in the present disclosure may be extensively used in large metropolitan areas in which millions of vehicles can simultaneously tracked and monitored. Using the vehicle tracker and method as disclosed herein, a fleet operator may use multiple vehicle trackers 102 in the vehicles and monitor the operation of the vehicles individually or collectively.

As used herein, the term 'module' refers to an application specific integrated circuit (ASIC), an electronic circuit, a processor (shared, dedicated, or group) and memory that execute one or more software or firmware programs, a combinational logic circuit, and/or other suitable components that provide the described functionality.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "has", "having" and variations thereof mean "including but not limited to", unless expressly specified otherwise. The enumerated listing of items does not imply that any or all the items are mutually exclusive, unless expressly specified otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A vehicle tracker for monitoring an operation of a vehicle, the vehicle having an air conditioning system for regulating a temperature inside a cabin of the vehicle, the vehicle tracker comprising:
   a connection port configured to selectively connect the vehicle tracker to a power source of the vehicle, the connection port being configured to receive power from the power source;
   a rechargeable battery configured to power the vehicle tracker when power is unavailable from the power source of the vehicle, the rechargeable battery being configured to be charged using power from the power source;
   a plurality of sensors communicating with a processor and configured to detect a plurality of parameters associated with the vehicle, the detected plurality of parameters generating a plurality of current parameter values, which indicate a real-time operating condition of the vehicle, the plurality of sensors including: (i) at least one temperature sensor mounted inside the cabin of the vehicle, the at least one temperature sensor being configured to detect the temperature inside the cabin, (ii) a vibration sensor configured to detect an engine of the vehicle operating in an idle state, and (iii) a location sensor configured to detect a location of the vehicle;

one or more controllers configured to:
compare the plurality of current parameter values to a plurality of parameter threshold values stored in a parameter database; and
determine one or more anomalies based on at least one of the plurality of current parameter values exceeding a corresponding parameter threshold value of the plurality of parameter threshold values, the determined one or more anomalies indicating an abnormal state of the operation of the vehicle in real-time, the abnormal state including operating of the air conditioning system of the vehicle while the vehicle is stationary beyond a threshold period of time; and a communication port configured to connect the one or more controllers to the internet, the one or more controllers being configured to receive, from the internet, weather information corresponding to the location of the vehicle in real-time, the weather information including a value of a temperature corresponding to the location of the vehicle, wherein:
the one or more controllers is configured to determine operation of the air conditioning system of the vehicle while the vehicle is stationary for a period of time exceeding the threshold period of time based on a comparison of current parameter values received from the vibration sensor, the location sensor, the at least one temperature sensor, and the weather information.

2. The vehicle tracker as claimed in claim 1, wherein:
the one or more controllers is further configured to:
generate one or more alerts corresponding to the one or more anomalies, the one or more alerts being generated in a form of at least one of a text message, an image, and a video; and
the vehicle tracker further comprises a transmitter to transmit the one or more alerts to a user device.

3. The vehicle tracker as claimed in claim 1, wherein the plurality of parameters include at least one of sound, speed, temperature, vibration, an image of a cabin of the vehicle, location, an image from a front camera, and an engine status of the vehicle.

4. The vehicle tracker as claimed in claim 1, wherein the plurality of sensors further includes at least one of a sound sensor, an image sensor, and a voltage sensor.

5. The vehicle tracker as claimed in claim 1, wherein:
the one or more anomalies include at least one of:
an engine status of the vehicle is in the idle state for a threshold period of time,
the temperature of the cabin of the vehicle exceeding a predefined temperature threshold,
a vibration of the vehicle exceeding a predefined vibration threshold,
a sound level inside the cabin of the vehicle exceeding a predefined sound threshold,
tampering with a component of the vehicle from an original position of the component, and
tampering with one or more components of the vehicle tracker; and
the predefined threshold period of time, the predefined temperature threshold, the predefined vibration threshold, and the predefined sound threshold are each one of the plurality of parameter threshold values.

6. The vehicle tracker as claimed in claim 1, further comprising an emergency switch configured to transmit an emergency notification to a user device, the emergency notification being generated based on at least one of:
when the emergency switch is pressed for a predefined time period, and
when a sound sensor recognizes, using voice recognition technique, predefined words spoken by at least one of a driver and a passenger of the vehicle.

7. The vehicle tracker as claimed in claim 1, further comprising a front camera configured to capture traffic data and path data associated with a path traveled by the vehicle, the path data including information pertaining to at least one of bumps, road condition, street signs, and potholes.

8. The vehicle tracker as claimed in claim 7, wherein the one or more controllers are configured to process the traffic data and the path data to determine real-time assistance information, the real-time assistance information providing assistance while the vehicle is being driven.

9. A method of monitoring an operation of a vehicle by using a vehicle tracker, the method comprising:
providing a connection port on the vehicle tracker to selectively connect the vehicle tracker with a power source of the vehicle, the connection port being configured to receive power from the power source;
providing a rechargeable battery to the vehicle tracker to power the vehicle tracker when power is unavailable from the power source of the vehicle, the rechargeable battery being configured to be charged using power from the power source;
sensing, by a plurality of sensors communicating with one or more controllers of the vehicle tracker, a plurality of parameters associated with the vehicle, the sensed plurality of parameters generating a plurality of current parameter values, which indicate a real-time operating state or condition of the vehicle, the plurality of current parameter values including at least one of a temperature inside a cabin of the vehicle, a vibration of the vehicle, and a location of the vehicle;
receiving, by a communication port, weather information corresponding to the location of the vehicle;
comparing, by the one or more controllers, the plurality of current parameter values to a plurality of parameter threshold values stored in a parameter database and the weather information; and
determining, by the one or more controllers, one or more anomalies based on at least one of the plurality of current parameter values exceeding a corresponding parameter threshold value of the plurality of parameter threshold values, the determined one or more anomalies indicating an abnormal state of the operation of the vehicle in real-time, such that the abnormal state indicates that the air conditioning system is operating while the vehicle is stationary beyond a threshold period of time.

10. The method as claimed in claim 9, further comprising:
generating, by the one or more controllers, one or more alerts corresponding to the one or more anomalies, the one or more alerts being generated in a form of at least one of a text message, an image, and a video; and
transmitting, by a transmitter, the one or more alerts to a user device associated with a user.

11. The method as claimed in claim 9, wherein the plurality of parameters includes at least one of sound, speed, temperature, vibration, image of the cabin, location, outside image, and engine status of the vehicle.

12. The method as claimed in claim 9, wherein the plurality of sensors includes at least one of a sound sensor, a vibration sensor, a temperature sensor, an image sensor, a location sensor and a voltage sensor.

13. The method as claimed in claim 9, wherein:
the one or more anomalies include at least one of:
an engine status of the vehicle is in an idle state for a predefined threshold period of time,
the temperature of the cabin of the vehicle exceeding a predefined temperature threshold,
the vibration of the vehicle exceeding a predefined vibration threshold,
a sound inside the cabin of the vehicle exceeding a predefined sound threshold,
tampering with a component of the vehicle from an original position of the component, and
tampering with one or more components of the vehicle tracker; and
the predefined threshold period of time, the predefined temperature threshold, the predefined vibration threshold, and the predefined sound threshold are each one of the plurality of parameter threshold values.

14. The method as claimed in claim 9, further comprising:
at least partially masking a video captured by at least one of a front camera and an image sensor; and
transmitting, by a transmitter, the masked video to a user device associated with a user.

15. The vehicle tracker as claimed in claim 1, wherein the vehicle tracker is configured to collect data for designing autonomous vehicles and by other authorities for determining road conditions.

16. The vehicle tracker as claimed in claim 1, wherein the vehicle tracker is a portable device configured to be selectively connected with the vehicle, and the vehicle tracker is configured to monitor operation of the vehicle by being removably mounted inside the cabin of the vehicle to sense the plurality of parameters.

17. A method of monitoring operation of a vehicle using a vehicle tracker, the vehicle tracker being a portable device being configured to be removably mounted inside a cabin of the vehicle, the method comprising:
detecting, by a vibration sensor of the vehicle tracker, an idling state of an engine of the vehicle based on vibrations in the cabin of the vehicle;
determining, by a location sensor of the vehicle tracker, movement of the vehicle;
receiving, from the internet, by a communication port of the vehicle tracker, weather information corresponding to a real-time location of the vehicle, the weather information including a first temperature corresponding to the location of the vehicle in real-time;
detecting, by a temperature sensor of the vehicle tracker, a second temperature inside the cabin of the vehicle; and determining, by a controller, the air conditioning system operating while the vehicle is stationary beyond a threshold period of time based on a comparison of inputs from the vibration sensor, the location sensor, the communication port, and the temperature sensor.

18. The method as claimed in claim 17, wherein the step of determining, by the controller, the air conditioning system running while the vehicle is stationary beyond a threshold period of time includes:
determining, a difference between the first temperature and the second temperature exceeding a predetermined threshold;
determining, based the input from the vibration sensor, the engine is operating in the idle state for the predetermined threshold period of time; and
determining, based in the input from location sensor, the vehicle is stationary for the predetermined threshold period of time.

19. A vehicle tracker configured for mounting inside a cabin of a vehicle, the vehicle including an air conditioning system for regulating temperature inside the cabin, the vehicle tracker comprising:
a housing;
a plurality of sensors disposed inside the housing, the plurality of sensors including at least a vibration sensor, a temperature sensor, and a location sensor;
a controller disposed in the housing, the controller coupled with the plurality of sensors; and
a communication port disposed in the housing, the communication port being configured to connect the controller with the internet to exchange data and receive weather information corresponding to a location of the vehicle, the weather information including a first temperature corresponding to a location of the vehicle, wherein:
the controller is configured to determine the air conditioning system is operating while the vehicle is stationary beyond a threshold period of time based on a comparison of inputs from the vibration sensor, the location sensor, the temperature sensor, and the weather information.

20. The vehicle tracker as claimed in claim 19, further comprising:
a power source configured to supply power for operation of the vehicle tracker; and
a connection port configured to be a removably connected to a charging port of the vehicle to charge the power source.

* * * * *